US006662938B2

(12) United States Patent
Damkjaer

(10) Patent No.: US 6,662,938 B2
(45) Date of Patent: Dec. 16, 2003

(54) LOCKING ARRANGEMENT FOR RELEASABLY LOCKING A TRANSVERSE ROD TO A CHAIN LINK

(75) Inventor: Poul Erik Damkjaer, Vejle (DK)

(73) Assignee: uni-chains A/S, Vejle (DK)

( * ) Notice: Subject to any disclaimer, the term of this patent is extended or adjusted under 35 U.S.C. 154(b) by 0 days.

(21) Appl. No.: 10/179,303

(22) Filed: Jun. 26, 2002

(65) Prior Publication Data

US 2003/0168322 A1 Sep. 11, 2003

(30) Foreign Application Priority Data

Mar. 8, 2002 (DK) ........................................ 2002 00353

(51) Int. Cl.$^7$ .............................................. B65G 17/06
(52) U.S. Cl. ....................................................... 198/852
(58) Field of Search ................................. 198/852, 853

(56) References Cited

U.S. PATENT DOCUMENTS

| 5,662,211 A | * | 9/1997 | Quentin ....................... 198/853 |
| 5,826,705 A | * | 10/1998 | Ramsey et al. ............. 198/853 |
| 5,960,937 A | * | 10/1999 | Stebnicki et al. ........... 198/852 |
| 6,213,292 B1 | * | 4/2001 | Takahashi et al. .......... 198/853 |
| 6,216,854 B1 | | 4/2001 | Damkyaer |

FOREIGN PATENT DOCUMENTS

EP 0931736 7/1999

* cited by examiner

Primary Examiner—Joseph E. Valenza
(74) Attorney, Agent, or Firm—James Creighton Wray; Meera P. Narasimhan

(57) ABSTRACT

The invention provided for a conveyor belt wherein chain links are assembled such that eye parts are inserted into the intervals between two eye parts in the opposite chain link, whereafter the transverse rod according to the invention is inserted from one side of the conveyor belt through the overlapping openings in both chain links. When the notches provided on the transverse rod adjacent the head portion come into contact with the end face of the chain link, i.e. the side of the chain link, the notches can be brought into engagement with slits provided in the outmost chain link by twisting the head portion and pushing it into the end portion of the chain link. When the notches are engaged in the slits the transverse rod is fixated such that it will not move sideward in relation to the longitudinal direction of the conveyor belt.

8 Claims, 2 Drawing Sheets

LOCKING ARRANGEMENT FOR RELEASABLY LOCKING A TRANSVERSE ROD TO A CHAIN LINK

This application claims the benefit of Danis Application No. PA 2002 00353 filed Mar. 8, 2002.

FIELD OF THE INVENTION

The invention relates to a locking arrangement for releasably locking a transverse rod to a chain link in a conveyor belt, where the conveyor belt is built from a number of more or less identical chain links, wherein each link possesses openings such that each chain link may be joined to a neighboring link in a hinge like manner by inserting said transverse rod.

BACKGROUND OF THE INVENTION

Conveyor belts are traditionally built up from a large number of more or less identical chain links.

In a number of instances it is desirable to be able to have an endless belt, which turns to the side or where it is possible to change elevation of the surface of the belt. It is in these circumstances desirable that Fe belt is able to flex ID a sideward direction. This can be achieved with the belt as disclosed in EP 0 931 736, which discloses a side-flexing conveyor belt built up of a number of chain links. Each chain link comprises a core which extends from one side of the conveyor belt to the other side of the conveyor belt. On both sides of the core in the lengthwise direction of the conveyor belt are arranged eye parts spaced with mutual intervals between them, and on the other side of the core are corresponding eye parts with mutual intervals spaced in a staggered relationship, such that the eye parts on one side of the core fit into the intervals between two eye parts on another chain link.

In the eye parts are provided openings, which extend through the eye part in a direction from one side of the conveyor belt to the opposite side. By inserting one chain link such that the eye parts fit into the intervals between two eye parts in the other chain link the openings arranged in both chain links will be superposed, i.e. overlapping, such that a transverse rod can be inserted through the openings in all the eye parts, and thereby link the two chain links together in a hinge like manner. With this arrangement the conveyor belt becomes flexible in one dimension, namely it can change elevation through the run of the belt.

By further shaping the openings in the eye parts, e.g. by making them oval this will give rise to a certain play between two mutually linked chain links, whereby the conveyor belt becomes side-flexing.

In order to maintain the transverse rod in its position in the openings between two chain links it is customary to provide inserts which are to be fitted through corresponding openings arranged in each end of the chain link. The transverse rod is hereby kept in place in the openings between two opposing inserts.

If a transverse rod or a chain link needs to be replaced, e.g. due to wear, breakage, or the like, this is done by forcing the inserts out of the engagement in the openings provided in each side of the belt and thereafter pulling out the transverse rod. If one link has to be removed this necessitates that two transverse rods have to be removed, which m turn means that four inserts have to be taken out. Thereafter, a new chain link is fitted, and inserts and corresponding transverse rods are reinserted and locked in position by the inserts.

As these conveyor belts are often arranged in connection with complicated production equipment the work space is often somewhat limited and access to the point of breakage or the conveyor belt per se can be very cumbersome. Also for conveyor belts having a substantial width it is often necessary and advantageous to have two persons cooperating when replacing a chain link.

Conveyor belts of the type mentioned above having locking inserts in both sides of the conveyor belt in order to keep the transverse rod engaged in a hinge like. manner and connecting to adjacent chain links have a number of drawbacks.

In the foodstuff industry there is an increasing demand for improved hygiene in connection with working, treating, and transporting foodstuffs. Furthermore, it is a requirement that there are as few parts as possible and absolutely no loose smaller parts, which can be enclosed in the produced foodstuffs from the machinery used for the manufacture of the foodstuffs. A second requirement is the hygienic standard, where it must be possible to thoroughly clean each and every single chain link in a manner, such that it is sufficiently safe that no unwanted bacteria or other pollution get an opportunity to fasten and develop themselves within the conveying belt structure.

The invention provides an assembly system wherein the side flexing conveying belt is assembled with the locking arrangement comprising oval openings and a transverse rod, wherein it is possible to clean around the transverse rod in all the openings. Furthermore, the stiff head portion of the transverse rod, which becomes engaged in an eye portion immediately adjacent the slit, see further explanation below, does not give rise to any hygienic circumstances which could pollute or infect the produced food-stuffs.

In another application, where conveyor belts of this type are fragile, is in transporting of persons, e.g. in connection with assembly lines, for example when assembling engine in car assembly plants or other industrial complexes, where the workers are transported alongside the goods to be produced. If a person drops an item and if the item is small enough it will have a tendency to become stuck between the separate chain link in the conveying belt. By using a conveying belt with eye parts and intervals the open spaces, where parts can become stuck, are very limited in that the entire surface of the conveying belt save limited tolerance spaces between two chain links, is more or less solid. It is therefore much more difficult for foreign objects to becomes lodged between the separate chain links. Furthermore, should it occur that an object becomes stuck or fastened and causes damage to the conveying belt due to the releasable structure of the transverse rods in connection with the chain links as described above it is possible to quickly and easily release the locking arrangement by twisting the transverse rods through the notches out of engagement with the slits in the chain links and thereby remove first the rod and thereafter the affected chain links New links can very easily be inserted just by fitting them so that the openings in the eye parts overlap between the new and the old links and insert a transverse rod in the over-lapping openings followed by a twisting of the transverse rods, such that the notched engage the slits in the chain links.

SUMMERY OF THE INVENTION

The present invention improves on the prior art devices in that by the inventive concept of the invention it becomes possible for one person to quickly and with fewer parts to replace and assemble a conveyor belt of the type mentioned above.

The invention accomplishes this by providing a locking arrangement, wherein each link superposed with an opening is provided with at least one slit oriented substantially perpendicular to the longitudinal direction of the transverse rod; each transverse rod is provided with a head portion, and at least one notch proximate the head, adapted for engagement with the slit when the transverse rod is inserted in the openings, and the outermost surface of the head portion is substantially flush with the edge of the link.

When assembling a conveyor belt two chain links are assembled such that eye parts are inserted into the intervals between two eye parts in the opposite chain link, where-after the transverse rod according to the invention is inserted from one side of the conveyor belt through the overlapping openings in both chain links. When the notches provided on the transverse rod adjacent the head portion come into contact with the end face of the chain link, i.e. the side of the chain link, the notches can be brought into engagement with the slits by twisting the head portion and pushing it into the end portion of the chain link. When the notches are engaged in the slits the transverse rod is fixated such that it will not move sideward in relation to the longitudinal direction of the conveyor belt.

In a further advantageous embodiment of the invention the slit is provided in an outer portion of each chain link. Although the system assembling conveyor belts consisting of a multitude of chain links by inserting a transverse rod in eyelets can have a number of embodiments, one preferred embodiment is a chain belt where the transverse rods extend fully from one side of the conveyor belt to the opposite side. In this embodiment the slits can advantageously be arranged in the outermost portion of a chain link, whereby access when replacing or installing the links with transverse rods in a locking arrangement according to the invention becomes easily accessible. In another belt for a conveyor belt the chain links are assembled in a central region underneath the carrying surface of the conveyor belt. It is evident that the locking arrangement according to the invention is equally suitable for fixating the transverse rod in relation to the chain links in a manner as described above.

In a further advantageous embodiment the head portion of the transverse rod is provided with a groove. By way of this groove it becomes possible to insert a screw driver or similar tool in order to twist the transverse rod and thereby the notches and it the same time push the transverse rod into a position, where it becomes possible to twist the notches into engagement with the slit. This makes installing and replacing the transverse rods especially easy and does not require special tools.

In order to further ease the installing of the transverse rods with the notches the opening adjacent the slit may be beveled. Usually the types of chain links, which are used according to the invention, are made by injection moulding of a plastic material. The plastic material is inherently flexible and when the notches, which have a cross measure which is larger than the openings in the chain links, are forced through the opening the chain link will accommodate this movement by flexing in a section immediately adjacent the slit Once the notches engage into the slits the chain link will flex back and lock the transverse rods in its locking position. In order to ease this flexing and the insertion of the transverse rods the sides of the opening immediately adjacent the transverse rod insertion place can be beveled, whereby it is possible for the slits to slide and at the same time flex the plastic material around the opening.

Turning now to the shape of the notches it is clear that since they need to be able to flex the material they must have a limited size in order not to force the material around the opening so far apart that permanent damage occurs. On the other hand the notches must have a sufficient size, whereby it is possible that when the plastic material of the chain link flexes back once the notches have engaged the slits the notches will be of a size, whereby they are securely held in the slits The notches can have any suitable shape, e.g. they can be in the shape of a prism, cylinder, cube, truncated cone or any other three-dimensional shape suitable for engagement with the slit. Especially one surface of the notch can be cut in such a way that as was the case with the beveled surface around the opening the top surface of the notch can be beveled in order to ease the sliding movement once the transverse rod is inserted into the opening.

In order to further facilitate the holding and securing of the transverse rod in relation to the chain links a slit can be provided on both sides of the chain link, and in this manner it is possible to access the conveyor belt and replace transverse rods and chain links from either side of the conveyor belt. Also the chain link can be provided with two slits in both sides as well as the transverse rod can be provided with two or more notches.

The locking arrangement according to the invention can in a further embodiment be advantageously made by an injection moulding process, such that each link has a core section and that on both sides of the core and mutually offset eye parts having openings are provided, such that the links in a staggered configuration facilitate the insertion of the transverse rod through said openings. By assembling two chain links having offset eye parts, such that the eye parts of one chain link fit into the space between two eyelets on a different chain link, the openings can be brought into an overlapping relationship, whereby it becomes possible to insert the transverse rod. When the rod is inserted the two chain links are connected in a hinge like manner, whereby the conveyor belt is flexible in one direction By making the openings of the eyelets as explained above oval or rectangular it becomes possible to flex the conveyor belt sideward.

The transverse rod can also be produced by an extrusion process The main body of the rod is extruded. The notches and optionally also the head portion of the rod is then either immediately after extrusion or after reheating at least an end portion of the rod deformed to the desired shape.

The chain links and transverse rod as explained above are explained with reference to an injection plastic moulding process. However, other types of material and other types of production processes can be contemplated which falls within the scope of the invention as defined by the claims For example the material might be a fiber reinforced plastic, cast in moulds, composite materials which are not suitable for injection moulding, steel, etc.

The invention will now be explained with reference to the accompanying drawing, wherein

DETAILED DESCRIPTION OF THE PREFERRED EMBODIMENTS

Figure 1:
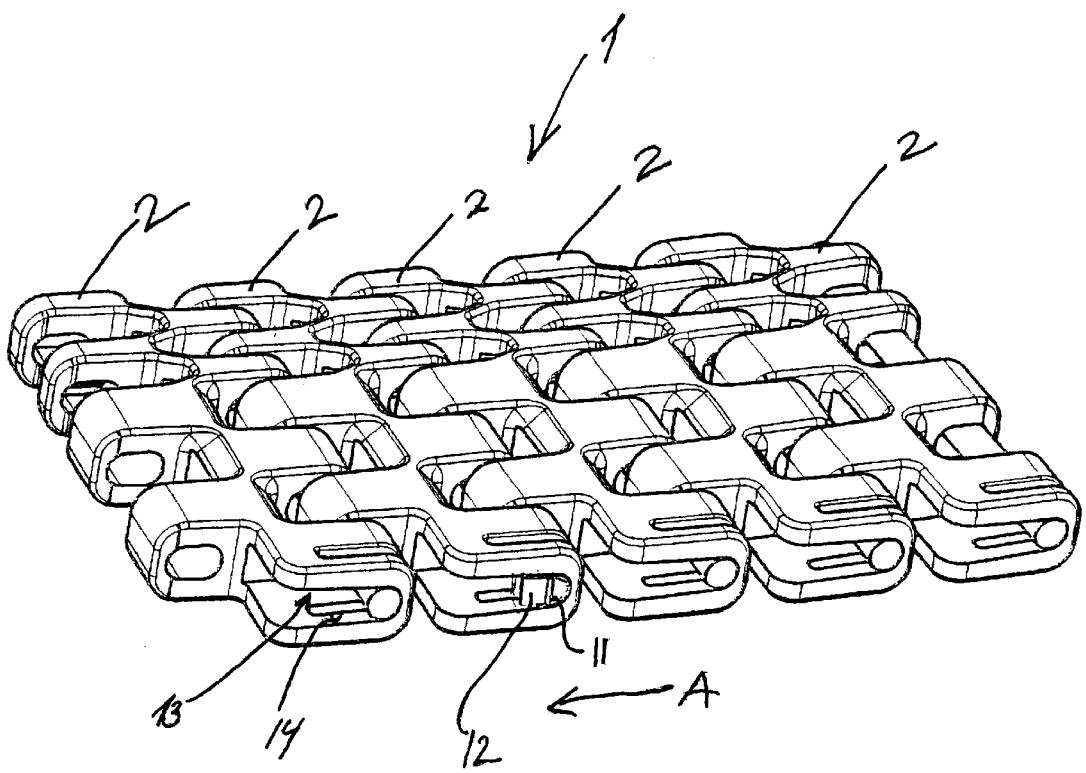
FIG. 1 illustrates a section of a conveyor belt according to the invention.

A flexible conveyor belt 1 is built up of a number of more or less identical chain links 2. The chain links, see FIGS. 2a and b, each comprise a core 3. On either side of the core 3 there are eye parts 4 extending out from said core and mutually offset on either side of the core 3. The eye parts are separated by intervals 5, where each interval 5 has a width perpendicular to the intended travel direction A (see FIG. 1) of the conveyor belt, which is slightly larger than the width of an eye pan. Hereby it is possible to insert the eye parts of a second identical chain link into the corresponding intervals 5 of a first chain link, as can be seen in FIG. 1. The openings 6, 7 in respective eye parts hereby becomes overlapping, such that a transverse rod as illustrated in FIG. 3 can be inserted through the openings in two chain links brought into the above described overlapping relationship with respect to their openings 6, 7.

It is of course evident that the diameter of the transverse rod must be small or equal to the diameter of the openings 6, 7, so that the transverse rod can be accommodated in the openings 6, 7.

Figure 3:
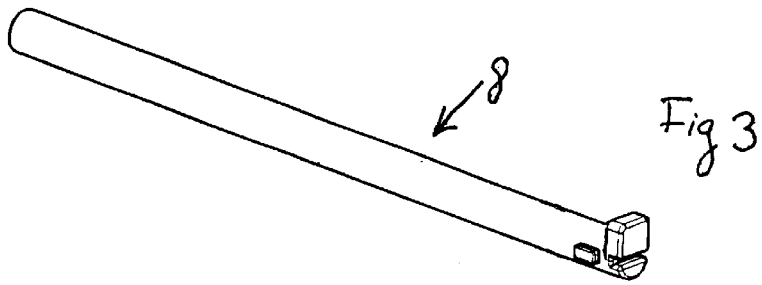
FIG. 3 illustrates a transverse rod according to the invention.
Figure 2A:
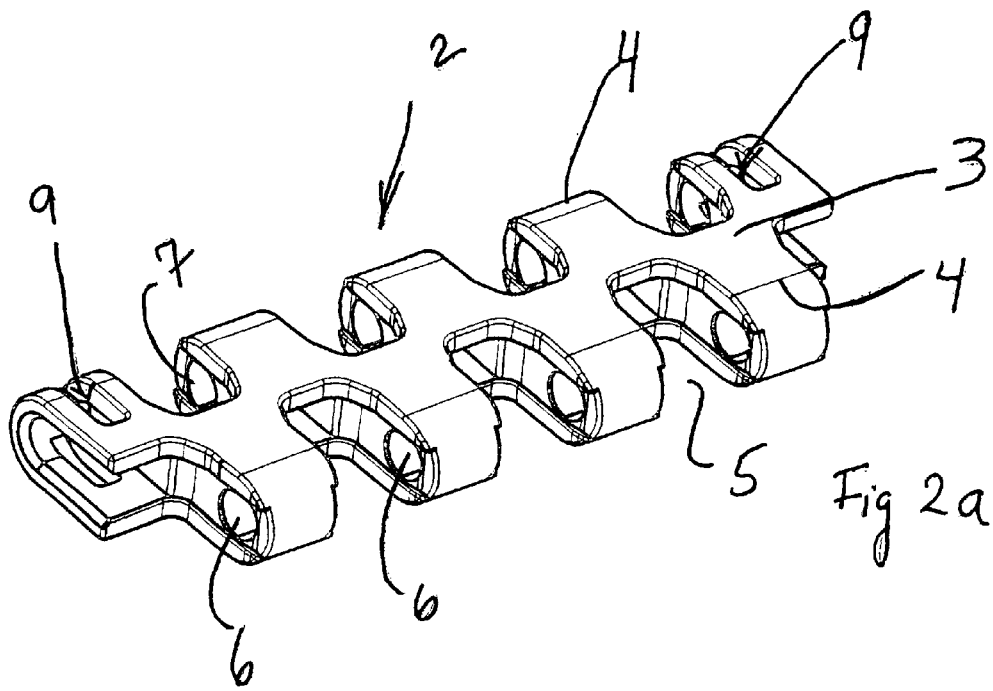
FIGS. 2a–b illustrate chain links suitable to be assembled by a locking arrangement according to the invention.
Figure 2B:
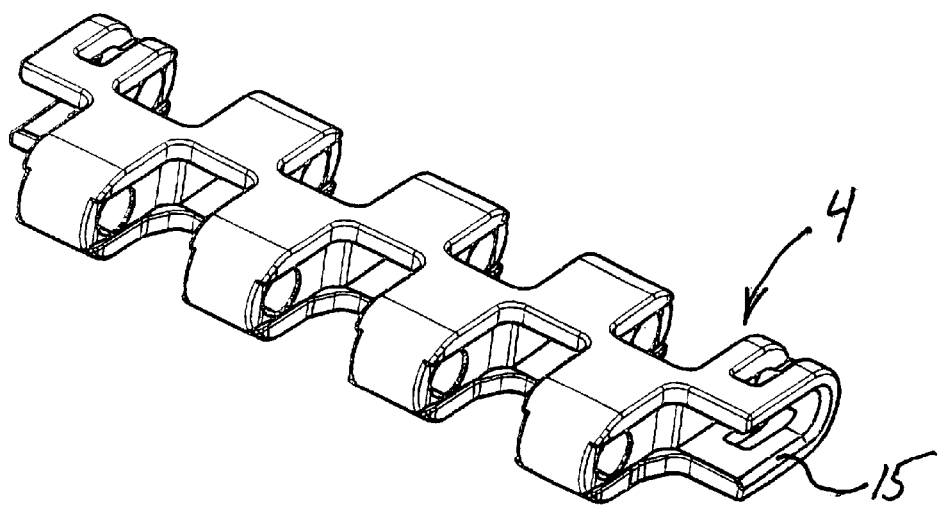

One example of a transverse rod according to the invention is illustrated in FIG. 3. The transverse rod is a substantially cylindrical member, which has a length equal to the width of the conveyor belt, into which it is intended to be fitted. The width of a conveyor belt is defined as the direction perpendicular to the travel direction A of a conveyor belt as indicated in FIG. 1. In one end of the rod 8 means are provided which can go into engagement with corresponding means in a chain link as illustrated in FIG. 2a or 2b. In FIG. 2a the chain link is further provided with a slit 9 in an outmost portion of the chain link, i.e. in the outmost eye part. In this embodiment the slit is a continuous slit going from the top side of the conveying belt following the curvature of the eye part and ending in the bottom part. Although not necessary a slit 9 is provided in both ends of the chain link, thereby making it possible to insert a transverse rod 8 as illustrated in FIG. 3, which rod can engage with the slit from either side of the conveying belt.

Figure 4:
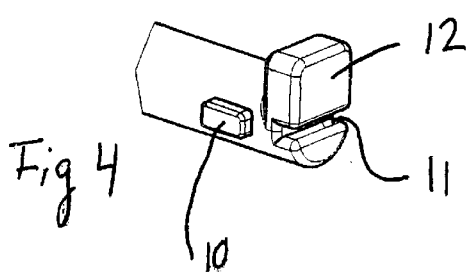
FIG. 4 illustrates a detail of the notch and head portion of the transverse rod.

The transverse rod 8 is illustrated in FIG. 3 equipped with the means for releasably locking into the slits 9 of the chain links 2. These locking means consist of one or more notches and a head portion as illustrated in FIG. 4, which is a detail of FIG. 3.

The notch 10 is in this embodiment illustrated as a rectangular member. The notch can be shaped in any suitable way, such that insertion into the end part of a chain link and engagement with the corresponding slit will be facilitated.

In order to facilitate this engagement the end of the rod 8 is provided with a groove 11 whereby a hand tool, as for example a screw driver, can be inserted and assist in the twisting of the rod 8 during insertion of the rod into the chain link 2.

In order to maintain the rod 8 in a non-rotating relationship with the chain link 2 the rod is provided with an extended head portion 12. This head portion has a size which makes it possible for the entire head portion to be inserted in between the upper and lower part 13, 14 (see FIG. 1), such that the head part 12 will be lodged and held against rotation in said opening. As can be seen in FIG. 1 one transverse rod having an extended head portion 12 is lodged inside the outermost eye portion between the upper surface 13 and the lower surface 14 in non-rotating engagement with the chain link. In this position the notch 10 will have engaged the slits 9, such that it is difficult to slide the rod 8 out of the direction of conveyor belt during normal operation. When having to remove a chain link due to wear, breakage, or breakage of a rod, this can be done by inserting a e.g. screw driver in the groove 11 twisting the screw driver, whereby the extended head portion 12 will cause the two parts 13, 14 apart, whereby it becomes possible to release the notches 10 from the slits 9 and thereby withdraw the entire rod 8.

When inserting a new rod into the overlapping openings 6 of two adjacent chain link this can be facilitated by providing a beveled surface 15 as illustrated in FIG. 2b. When the rod 8 is pushed through the openings 6 the notches 10 will eventually come into sliding engagement with the beveled surface 15. By further forcing the rod into the openings the beveled surface engagement with the notch will cause the upper and lower part 13, 14 of the eye pat 4 to widen, whereby it becomes possible to force the notches so far into the eye part 4 that the notches 10 will be engaged in the slits 9. The notches 10 have a size corresponding to the slits 9, such that they can be accommodated inside the slits with a minimum tolerance. Hereby is assured that the rod comprising the notches will not slide out through the openings during normal operation of the conveyor belt.

What is claimed is:

1. Locking arrangement for releasably locking a transverse rod to a chain link in a conveyor belt, where the conveyor belt is built from a number of more or less identical chain links, wherein each link possesses openings such that each chain link may be joined to a neighboring link in a hinge like manner by inserting said transverse rod, and wherein each chain link superposed with an opening is provided with at least one slit oriented substantially perpendicular to the longitudinal direction of the transverse rod; each transverse rod is provided with a head portion, and at least one notch proximate the head, adapted for engagement with the slit when the transverse rod is inserted in the openings, and the outermost surface of the head portion is substantially flush with the edge of the link.

2. Locking arrangement according to claim 1, wherein the at least one slit is provided in an outer portion of each chain link.

3. Locking arrangement according to claim 1, wherein a groove is provided in the head portion of the transverse rod for aiding in twisting the notch into the slit.

4. Locking arrangement according to claim 1, wherein the edge of the opening adjacent the slit may be beveled.

5. Locking arrangement according to claim 1, wherein the notch may be in the shape of a prism, cylinder, cube, truncated cone or any other three-dimensional shape suitable for engagement with the slit.

6. Locking arrangement according to claim 1, wherein a slit is provided in both sides of each chain link.

7. Locking arrangement according to claim 1, wherein each chain link of the conveyor belt is made by injection moulding and/or extrusion, such that each link has a core section, and that on both sides of the core and mutually offset eye parts having openings are provided, such that the links in a staggered configuration facilitate the insertion of the transverse rod through said openings.

8. Locking arrangement according to claim 1, wherein the head portion of the rod extends with a rectangular section perpendicularly to the longitudinal direction of the rod.

* * * * *